United States Patent
Inglis et al.

(10) Patent No.: US 11,907,068 B2
(45) Date of Patent: Feb. 20, 2024

(54) READ REQUEST RESPONSE FOR RECONSTRUCTED DATA IN A DEGRADED DRIVE

(71) Applicant: Nyriad, Inc., Dover, DE (US)

(72) Inventors: Stuart John Inglis, Cambridge (NZ); Sheridan John Lambert, Cambridge (NZ); Adam Gworn Kit Fleming, Cambridge (NZ); Daniel James Nicholas Stokes, Cambridge (NZ)

(73) Assignee: Nyriad, Inc., Dover, DE (US)

( * ) Notice: Subject to any disclaimer, the term of this patent is extended or adjusted under 35 U.S.C. 154(b) by 0 days.

(21) Appl. No.: 17/669,056

(22) Filed: Feb. 10, 2022

(65) Prior Publication Data
US 2022/0261314 A1    Aug. 18, 2022

Related U.S. Application Data

(60) Provisional application No. 63/149,829, filed on Feb. 16, 2021.

(51) Int. Cl.
*G06F 11/10* (2006.01)
*G06F 3/06* (2006.01)
*G06F 11/07* (2006.01)

(52) U.S. Cl.
CPC ........ *G06F 11/1084* (2013.01); *G06F 3/0619* (2013.01); *G06F 3/0656* (2013.01); *G06F 3/0689* (2013.01); *G06F 11/0772* (2013.01); *G06F 11/1092* (2013.01)

(58) Field of Classification Search
CPC ............ G06F 11/1084; G06F 11/1092; G06F 11/0772; G06F 3/0619; G06F 3/0656; G06F 3/0689

USPC ................................................ 714/6.24, 6.32
See application file for complete search history.

(56) References Cited

U.S. PATENT DOCUMENTS

| | | | |
|---|---|---|---|
| 6,871,263 B2 | 3/2005 | Dandrea | |
| 7,308,602 B2 | 12/2007 | Dandrea | |
| 8,782,339 B2 | 7/2014 | Au et al. | |
| 9,043,639 B2 | 5/2015 | Barrall et al. | |
| 9,235,472 B2 | 1/2016 | Sugawara et al. | |
| 10,585,770 B2 | 3/2020 | Wu et al. | |
| 10,592,336 B1 * | 3/2020 | Donlan | G06F 11/1076 |

(Continued)

FOREIGN PATENT DOCUMENTS

WO    2019172973 A1    9/2019

OTHER PUBLICATIONS

Alexander Thomasian et al: "Higher reliability redundant disk arrays", ACM Transactions on Storage, Association for Computing Machinery, New York, NY, US, vol. 5, No. 3, Nov. 30, 2009 (Nov. 30, 2009), pp. 1-59, XP058144808, ISSN: 1553-3077, DOI: 10.1145/1629075.1629076.

(Continued)

*Primary Examiner* — Chae M Ko
(74) *Attorney, Agent, or Firm* — Banner & Witcoff, Ltd.

(57) ABSTRACT

A method comprising: receiving a request to read data stored in an array of drives; determining that the data is stored on one or more degraded drives in the array; reconstructing the data from one or more drives in the array other than the degraded drives; providing the reconstructed data in response to the request; and after providing the reconstructed data, writing the reconstructed data to one or more drives in the array other than the degraded drives.

17 Claims, 6 Drawing Sheets

(56) References Cited

U.S. PATENT DOCUMENTS

| | | | |
|---|---|---|---|
| 11,561,860 B2* | 1/2023 | Ben Dayan | G06F 3/0652 |
| 2016/0380650 A1* | 12/2016 | Calder | H03M 13/2948 |
| | | | 714/766 |
| 2019/0278675 A1* | 9/2019 | Bolkhovitin | G06F 11/1088 |
| 2020/0057566 A1* | 2/2020 | Ben Dayan | G06F 3/061 |
| 2020/0073818 A1 | 3/2020 | Inglis et al. | |
| 2021/0208782 A1* | 7/2021 | Zhu | G06F 11/1076 |
| 2022/0414062 A1* | 12/2022 | Kamran | G06F 16/164 |

OTHER PUBLICATIONS

Nikolaus Jeremic et al: "Improving random write performance in homogeneous and heterogeneous erasure-coded drive arrays", ACM SIGAPP Applied Computing Review, ACM, 2 Penn Plaza, Suite 701 New York NY 10121-0701 USA, vol. 15, No. 4, Feb. 17, 2016 (Feb. 17, 2016), pp. 31-53, XP058081449, ISSN: 1559-6915, DOI: 10.1145/2893706.2893709.

Jul. 7, 2022—Extended European Search Report—EP 22156701.9.

Wikipedia, "RAID—Wikipedia," available at https://en.wikipedia.org/wiki/RAID, 9 pages, accessed Feb. 10, 2022.

Wikipedia, "Degraded mode," available at https://en.wikipedia.org/wiki/Degraded_mode, 1 page, accessed Feb. 10, 2022.

* cited by examiner

READ REQUEST RESPONSE FOR RECONSTRUCTED DATA IN A DEGRADED DRIVE

CROSS-REFERENCE TO RELATED APPLICATION

This application claims priority as a non-provisional of U.S. Provisional Patent Application No. 63/149,829, titled "READ REQUEST RESPONSE FOR RECONSTRUCTED DATA IN A DEGRADED DRIVE" and filed on Feb. 16, 2021, the disclosure of which is incorporated herein by reference in its entirety.

FIELD

This relates an approach for responding to a read request through reconstruction of a degraded subset of drives.

BACKGROUND

Data may be stored on drives, which have a number of blocks. A request to write data to the drive may specify a physical location (such as a block) of the drive at which to write the data. A request to read data from the drive may specify a physical location (such as a block) of the drive from which to read the data.

SUMMARY

In a first example embodiment, there is provided a method comprising: receiving a request to read data stored in an array of drives; determining that the data is stored on one or more degraded drives in the array; reconstructing the data from one or more drives in the array other than the degraded drives; providing the reconstructed data in response to the request; and after providing the reconstructed data, writing the reconstructed data to one or more drives in the array other than the degraded drives.

Preferably, the data stored in the array is erasure encoded.

Preferably, reconstructing the data from one or more drives in the array other than the degraded drives comprises: reconstructing the data from other data in the same stripe, the other data being stored on the one or more drives in the array other than the degraded drives.

Preferably, the reconstructed data comprises the data for which the request to read was received and one or more additional pieces of data.

Preferably, the method further comprises: after reconstructing the data, storing the reconstructed data in a buffer.

Preferably, providing the reconstructed data in response to the request comprises: providing the reconstructed data from the buffer.

Preferably, writing the reconstructed data to one or more drives in the array other than the degraded drives comprises: identifying a plurality of blocks of reconstructed data; and writing the plurality of blocks of reconstructed data as a stripe in the array.

Preferably, writing the reconstructed data to one or more drives in the array other than the degraded drives comprises: using a garbage collection process to write the reconstructed data to one or more drives in the array other than the degraded drives.

Preferably, determining that the data is stored on one or more degraded drives in the array comprises: determining that the one or more degraded drives are insufficiently responsive.

Preferably, determining that the data is stored on one or more degraded drives in the array comprises: determining that the one or more degraded drives have failed.

In a second example embodiment, there is provided a system comprising: one or more processors; and a memory; wherein the memory comprises instructions which, when executed by the one or more processors, configure the one or more processors to perform the method of the first example embodiment.

In a third example embodiment, there is provided a non-transitory computer readable medium comprising instructions which, when executed by one or more processors, cause the one or more processors to perform the method of the first example embodiment.

BRIEF DESCRIPTION

The description is framed by way of example with reference to the drawings which show certain embodiments. However, these drawings are provided for illustration only, and do not exhaustively set out all embodiments.

DETAILED DESCRIPTION

A storage controller is described which is configured to respond to a read request for data in a degraded drive. The data is reconstructed from one or more other drives. In this case, a storage controller is a general term for any program configured to administer storage: it does not imply any particular structure.

Data Storage

Figure 1:
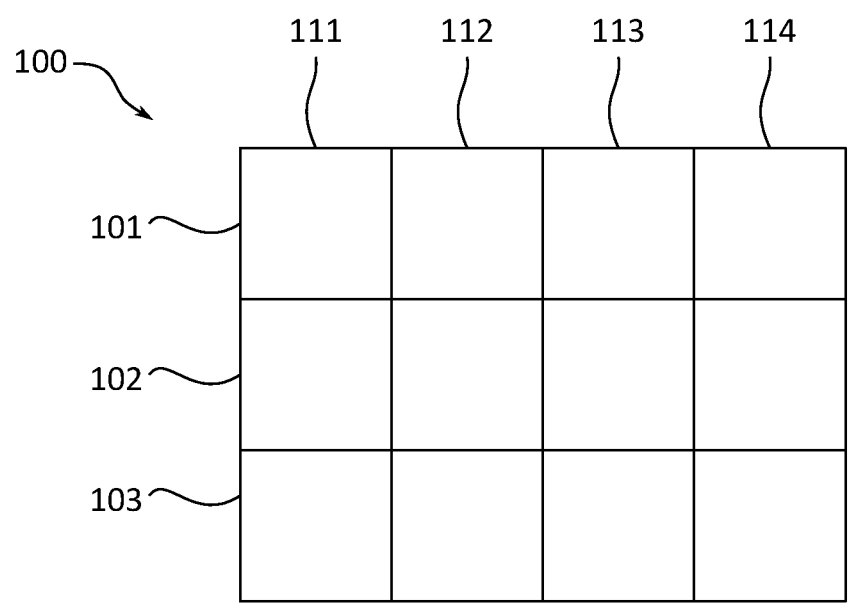
FIG. 1 shows an example approach for a storage controller to store data on drives.

FIG. 1 shows an example approach for a storage controller to store data on drives.

The system comprises multiple drives 101, 102, 103. A drive is configured to persistently store data even when the drive is unpowered and may be a hard disk drive (HDD), solid state drive (SDD), or the like. Each drive is configured to store data in a number of blocks of a predetermined size, such as 4096 bytes (4 KiB). Data can be read from the drive and written to the drive in units of 1 block.

A piece of data might therefore be stored on a single drive. However, storing a piece of data on a single drive risks data loss. If the drive fails or becomes corrupted, the piece of data may become unrecoverable.

To mitigate this, data is stored across multiple drives. A naïve approach is to duplicate the data across each of the drives in the array. However, while this provides redundancy (since the data could be retrieved from any of the drives), this reduces the overall capacity of the array, since for each piece of data, multiple copies of the data are stored.

A more efficient way to approach this is to erasure encode the data. Erasure coding is an approach in which a piece of data is encoded to form n data fragments, such that the original data is recoverable from any k data fragments (k≤n). This occurs by generating m=n−k parity fragments for storage with k data fragments. If the data fragments and parity fragments are distributed across multiple drives, this provides a level of redundancy (since up to n−k fragments can be lost before the data is unrecoverable). The values for n and k may be selected according to a preferred level of redundancy. Erasure encoding is described in more detail below.

The multiple drives can be configured to form an array 100. For example, there may be 200 drives in an array. Different drives in the array are preferably of the same type and same size. The array is configured such that data is stored in stripes 111, 112, 113. A stripe comprises one block of each of the drives 101, 102, 103 in the array 100. These may have the same physical location in each drive (for example, a stripe i is formed of the block with index i in every drive in the array).

The erasure encoded data may be stored in a stripe 111, 112, 113. Each stripe comprises n blocks, one of which is on each drive in the array. Within each stripe, k of the blocks include data and m of the blocks are parity, such that n=k+m. Consequently, the data can be recovered if any k of the blocks within a stripe is available (whether the blocks are data or parity). This may be described as k+m parity. One arrangement is 8+2 parity, where within a stripe there are 8 blocks of data and 2 blocks of parity.

When a particular block in the stripe is sought, the physical location of the block will be the location at which the data fragment associated with that block is stored. This can allow the data to be retrieved without needing to reconstruct the data from parity in the ordinary case.

This provides a configurable level of redundancy in data storage without unduly limiting the total capacity of the array.

While data is stored in erasure encoded stripes, the physical storage location where the data is stored may not be apparent externally. Instead, the storage controller may externally indicate that data is stored at a different location. This is called the virtual location. The storage controller maintains metadata comprising a mapping between a virtual location and a physical location. The metadata may be stored on one or more of the drives. Additionally or alternatively, the metadata is stored on a separate storage device which may be optimized for use as a cache.

When a program intends to store or retrieve data, the program provides the virtual location to the storage controller. The storage controller translates this into the physical location using the metadata, and then stores or retrieves the data from the physical location. The benefit of this mapping is that the storage controller can then move data into a new physical location without needing to update external programs.

Retrieving Data

Figure 2:
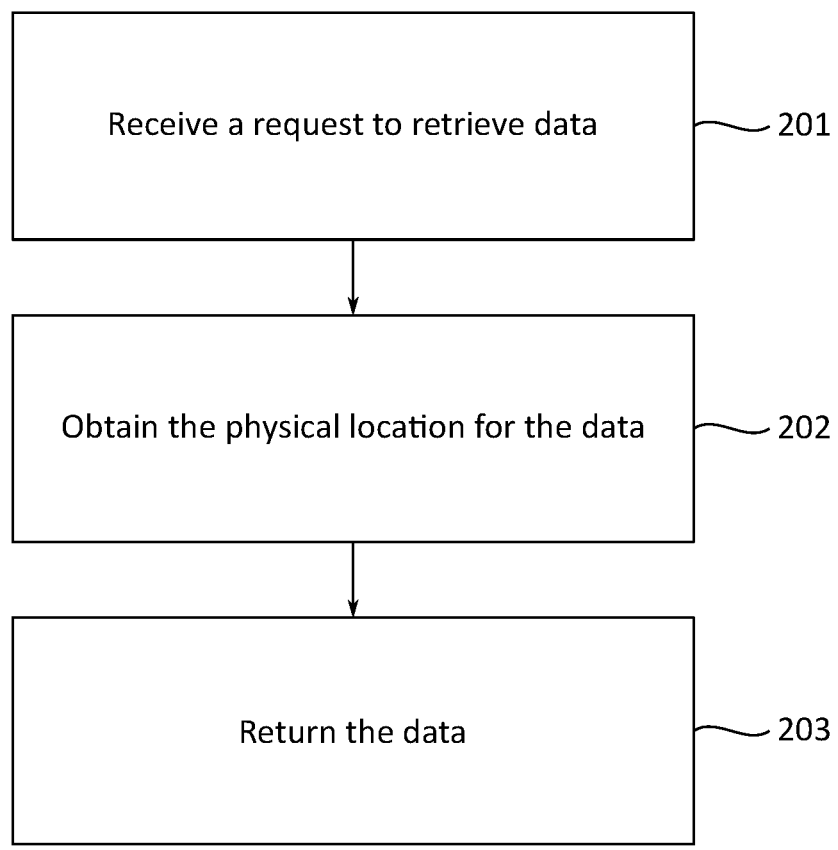
FIG. 2 shows an example approach for a storage controller to retrieve data from an array in response to a read request.

FIG. 2 shows an example approach for a storage controller to retrieve data from an array in response to a read request.

At step 201, a storage controller receives a request to retrieve data stored in the array.

The request may be in the form of a read instruction from a program running on a processor. This read instruction indicates that the processor should read a certain piece of data from storage and write it to a memory address. The data may be identified by a physical or virtual location in storage.

At step 202, the storage controller obtains the physical location for the data. The physical location may be identified as a stripe and a drive. Where the data is identified by a physical location in storage, this step may not be required. Where the data is identified by a virtual location, the virtual location is translated by a metadata table from virtual location to physical location.

At step 203, the storage controller returns the data. This occurs by obtaining the data from the physical location and writing the data to the memory address. The storage controller may then send an indication, such as an interrupt, to the program indicating the read is complete.

In this way, data can be retrieved from the array of drives.

Retrieving Data in Degraded Drive

The method shown in FIG. 2 presupposes that all drives are functioning. However, in some cases, one or more of the drives in an array may be degraded. In this case, degraded means that one or more of the drives have failed (and consequently cannot be access at all) or is insufficiently responsive (for example, cannot be accessed in a timely manner). In such cases, step 203 may not be executable.

Figure 3:
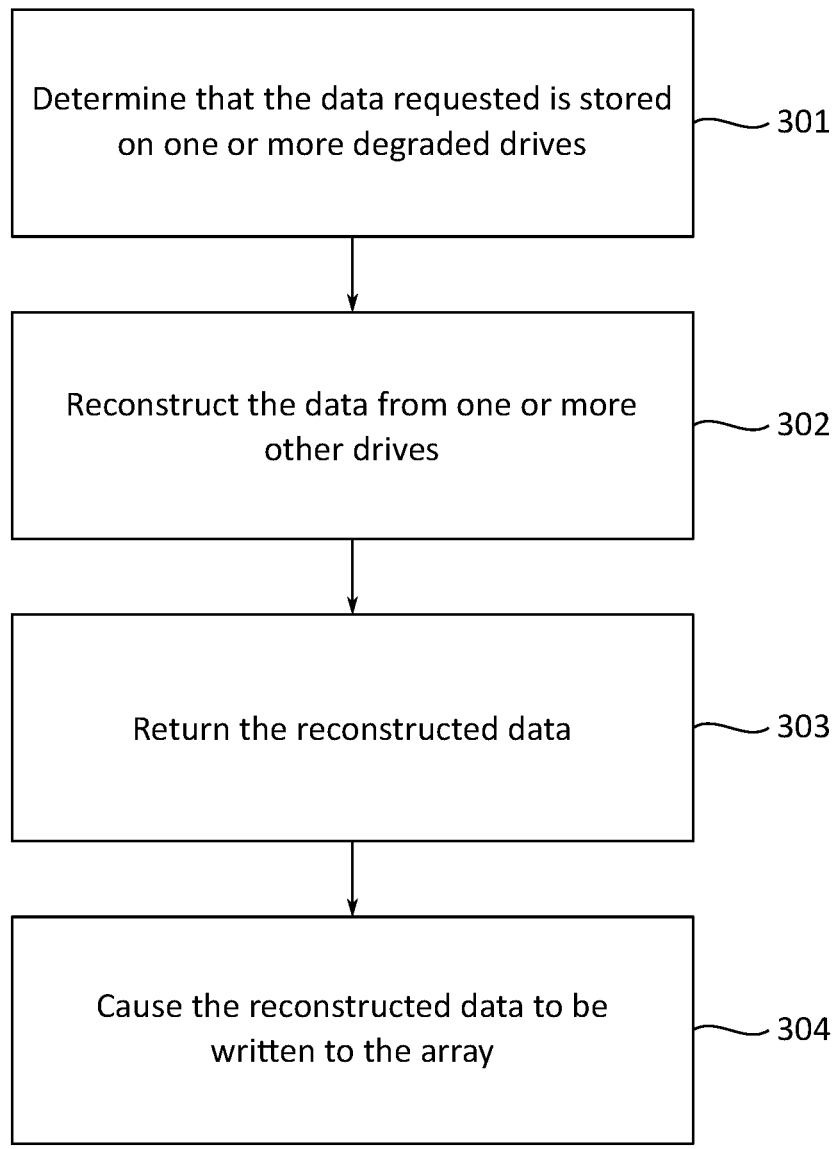
FIG. 3 shows an example approach for retrieving data in a degraded drive.

In such cases, the alternative approach shown in FIG. 3 can be used. This shows an example approach for retrieving data in a degraded drive. This occurs after step 201 or 202.

At step 301, the storage controller determines that the data requested is stored on one or more degraded drives.

This may be based on a failed request at step 203. The storage controller may have attempted, and failed, to obtain the data after a threshold time. In such a case, the storage controller may note that the relevant drive is degraded. Alternatively, the drive may have been previously noted as degraded. This may be from one or more previous failures to read data or from health data reported by the drive indicating a drive failure. In another case, the data may have been obtained from the one or more degraded drives already. However, if the obtained data failed a checksum, this could indicate that the drive has become corrupted.

At step 302, the storage controller reconstructs the data from one or more other drives. If the data was obtained from a block in a stripe, the data can be reconstructed from k blocks on other drives in the stripe (excluding the one or more degraded drives).

The selection of the drives from which the k blocks are obtained may occur by selecting a random subset of the drives in the array. Alternatively, all other blocks in the stripe may be obtained, even though not all are required. This can allow for reconstruction to occur as soon as the fastest k blocks are available.

The k blocks are then erasure decoded to obtain the original data. This occurs even though the data cannot be obtained from the drive storing the original data.

At step 303, the storage controller returns the reconstructed data. This may occur in the same way as step 203. That is, the reconstructed data is stored in memory for the program to access. The program which issued the request to retrieve data may not be aware of whether the data was returned at step 203 or returned at step 303. That is, whether the data needs to be reconstructed is not apparent to the user.

At step 304, the storage controller causes the reconstructed data to be written to the array. This occurs on one or more of the drives other than the degraded drives.

Figure 4:
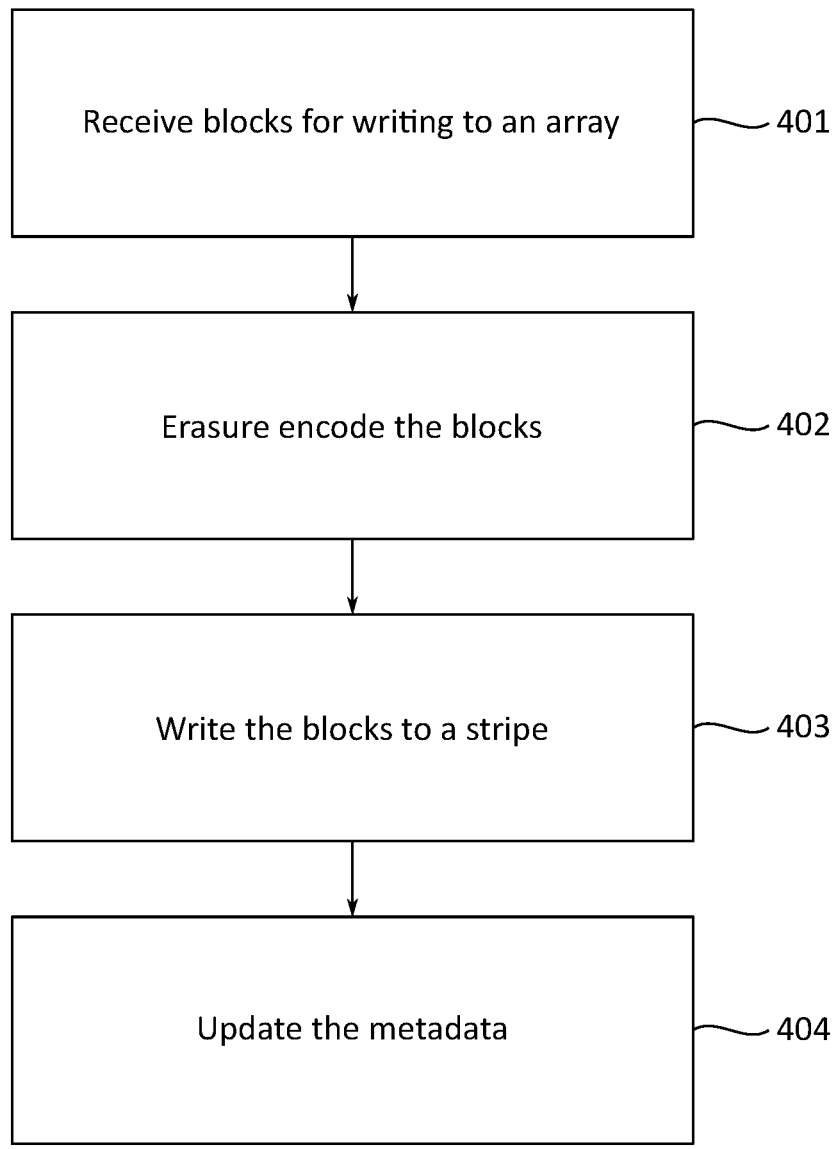
FIG. 4 shows an example for how a block can be written to an array.

In one example, this occurs in the same way as if data were being newly written to the array (that is, in response to a write request, rather than as part of reconstruction). An example of this approach is shown in FIG. 4.

Figure 5:
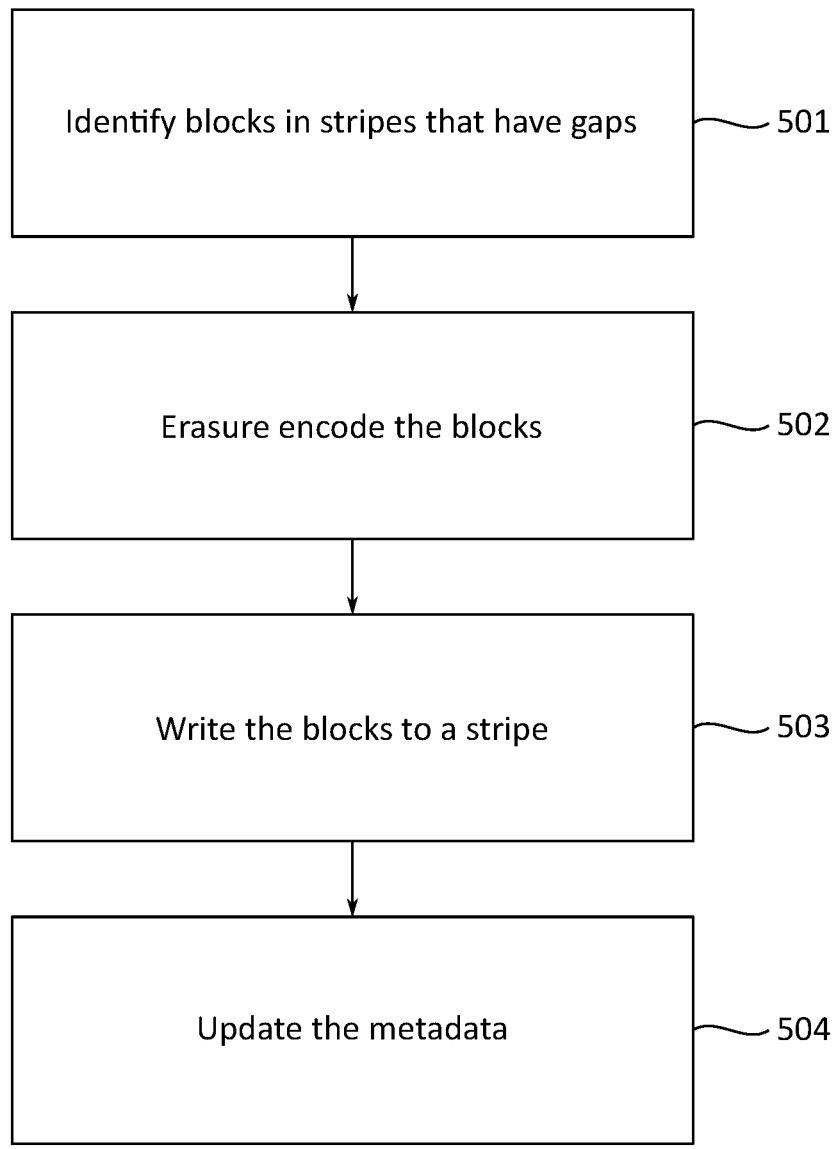
FIG. 5 shows an example approach for a storage controller to perform garbage collection.

In another example, this occurs during a garbage collection process. An example of this is shown in FIG. 5.

Step 304 occurs after step 303. That is, the storage controller returns the data before the reconstructed data is written to the array. This provides a perceived higher throughput since the read request is not delayed by the additional time to write data.

As a result, metadata is updated to indicate the new physical location where the reconstructed data is stored.

After step 304, subsequent reads to obtain the same data consequently do not need to be reconstructed again. Instead, the request will read from the location where the reconstructed data was written at step 304. This results in the performance of subsequent reads for the same data recovering to the performance of a non-degraded read. This improves the overall handling capacity of the storage controller.

During reconstruction at step 302, there may be additional blocks which are reconstructed, even though they were not requested to be read. In such a case, at step 304, the storage controller causes each additional reconstructed block to be written to the array. This can pre-emptively avoid the need to reconstruct the remaining blocks later.

Periodic Reconstruction

The method shown in FIG. 3 has been described as applying in response to a read failing. That is, a read request is received before any reconstruction occurs.

In some cases, the storage controller may reconstruct data even without a read request. For example, the storage controller may determine that one or more drives are degraded drives. In response to this, the storage controller may reconstruct data from the degraded drives. This pre-emptive reconstruction may be triggered by a period of low activity. For example, when the amount of data being read or written falls below a threshold, the storage controller may begin pre-emptive reconstruction. This can avoid even an initial delay caused by a degraded drive.

Writing

FIG. 4 shows an example for how a block can be written to an array.

At step 401, k blocks are received for writing to an array.

Since an entire stripe is written at once, the storage controller must have received enough blocks to write an entire stripe. That is, a single block is not written in isolation.

The k blocks may not be received at the same time: this is dependent on when the storage controller reconstructs sufficient data. Earlier received blocks may therefore be retained in a buffer until sufficient blocks have been received. The buffer may be non-volatile memory, which avoids the data being lost even if there is power loss.

However, once the block is stored in the buffer, it may be treated as having been successfully stored on a drive. That is, when the buffer is non-volatile, there is a very low chance of data loss. Consequently, in order to avoid delays in writing that would otherwise be caused by waiting for additional blocks, the storage controller may report a block as having been stored.

In some cases, metadata may be updated to indicate that the data is stored in the buffer. This can allow the data to be provided directly from the buffer in response to a subsequent read request, even though the data has not yet been written to a drive.

At step 402, the k blocks are erasure encoded to form n blocks, where k of the blocks include data and m of the blocks are parity, such that n=k+m. This results in the n blocks required to write a stripe. This can occur using the approach indicated below. The value for n may change over time to be equal to the number of non-degraded drives at the time. This can decrease as drives become degraded, and can increase if new drives are added.

At step 403, the blocks are written to a stripe.

The storage controller causes each non-degraded drive to store one of the erasure encoded blocks. The association between each block and the corresponding drive in the array may be determined based on a rotating start point. That is, for sequential stripes, the parity is written on a different subset of the drives. This can ensure that, when reading data, the reads are generally distributed across all the drives.

At step 404, the metadata is updated. After writing, the metadata will include an entry linking the virtual location of each block indicated in the initial read request to the physical location at which the data is stored. In addition, the metadata may further comprise a checksum for each block and/or for the stripe.

Once the metadata has been updated, the write is complete. The blocks stored in the buffer at step 401 may then be freed and overwritten with other data.

In this way, data can be written as stripes to the array with sufficient redundancy and with minimal delays.

Garbage Collection

Due to the data being stored in erasure encoded stripes, changing the data at one block in a stripe involves re-encoding the entire stripe. To avoid this overhead, when data is changed, it may be written to a new location, with the metadata for the virtual location being updated to reflect the new physical location. In addition, when data is deleted, the entry for the virtual location may be deleted, but the data stored in the physical location may be untouched. As the result of these operations, a given stripe may only have part of its blocks being accessible through a request to read at a virtual location. This can lead to insufficient utilization of the capacity of the array.

To remedy this, a storage controller may periodically perform garbage collection. This re-writes stored data into new stripes to avoid the gaps caused by changed or deleted data.

FIG. 5 shows an example approach for a storage controller to perform garbage collection.

At step 501, the storage controller identifies k data blocks in stripes that have gaps. A gap in a stripe is a block having data that no virtual address is mapped to the metadata.

At step 502, the k blocks are erasure encoded to form n blocks, where k of the blocks include data and m of the blocks are parity, such that n=k+m. This results in the n blocks required to write a stripe. This can occur using the approach indicated below.

At step 503, the blocks are written to a stripe. This may occur in the same way as step 403.

At step 504, the metadata is updated. After writing, the metadata entries for the virtual locations will be updated from the initial physical location (in a stripe with a gap) to the new physical location at which the data is stored. This may otherwise occur in the same way as step 404.

By periodically performing garbage collection, the array can store further data in the stripes which had gaps, which can improve the overall utilization of the array.

Garbage Collection for Reconstruction

Step 304 may use the garbage collection process to write reconstructed data to the array. This occurs through step 501 identifying reconstructed blocks as well as data blocks in stripes that have gaps.

This can improve the efficiency of reconstruction since this is likely to cause to the reconstructed data to be written to drive more quickly than otherwise. This is because a full stripe must be written at once: a single block of reconstructed data may therefore remain in a buffer for an unacceptably longtime awaiting further reconstructed blocks. In contrast, garbage collection is likely to provide sufficient blocks frequently.

Erasure Coding

As noted above, erasure coding is an approach in which a piece of data is encoded to form n data fragments. The original data is recoverable from any k data fragments (k≤n). Each data fragment is a w-bit word, where w can be any positive integer. For example, 1-bit and 8-bit are common. Generally, the higher the values for n and w, the more computationally intensive the erasure encoding and decoding process is.

First, the original data is segmented into w×k-bit data segments.

Second, k data fragments $d_1 \ldots d_k$ are formed by separating each data segment into k w-bit sized data words. These are data words.

Third, m=n−k data fragments $c_1 \ldots c_m$ are formed based on linear combinations of the data words with coefficients, such that:

$$c_i = a_{i,0} d_0 + \ldots + a_{i,k} d_k$$

where the arithmetic is defined over the Galois field $GF(2^w)$. These are coding words.

The data fragments can be stored in a stripe over an array of persistent storage devices, such that the data fragments are distributed over the persistent storage devices. In some cases, different persistent storage devices can hold different numbers of data fragments. Optionally, a checksum based on the data segment is also stored. Once all data segments are stored, a further checksum based on the original data can also be stored.

There are multiple ways to select the coefficients. One approach is to use a Cauchy Reed-Solomon code. This occurs by selecting n numbers in $GF(2^W)$ and partitioning them into two distinct sets $X=\{x_1, \ldots, x_m\}$ and $Y=\{y_1, \ldots, y_k\}$ with $X \cap Y = \emptyset$ such that:

$$a_{i,j} = \frac{1}{x_i + y_j}$$

where the arithmetic is defined over the Galois field $GF(2^w)$.

Once the data is stored, any k of the data fragments can be used to retrieve the data. For example, if the data words $d_1 \ldots d_k$ were obtained, these can be combined using the inverse of how they were segmented. If a coding word $c_i$ is used, a system of equations based on the equation noted above can be solved to obtain the missing data fragment.

In some situations, erasure encoding can be performed efficiently using one or more GPUs while the request itself is handled by one or more CPUs. This can result in improved overall performance.

System

Figure 6:
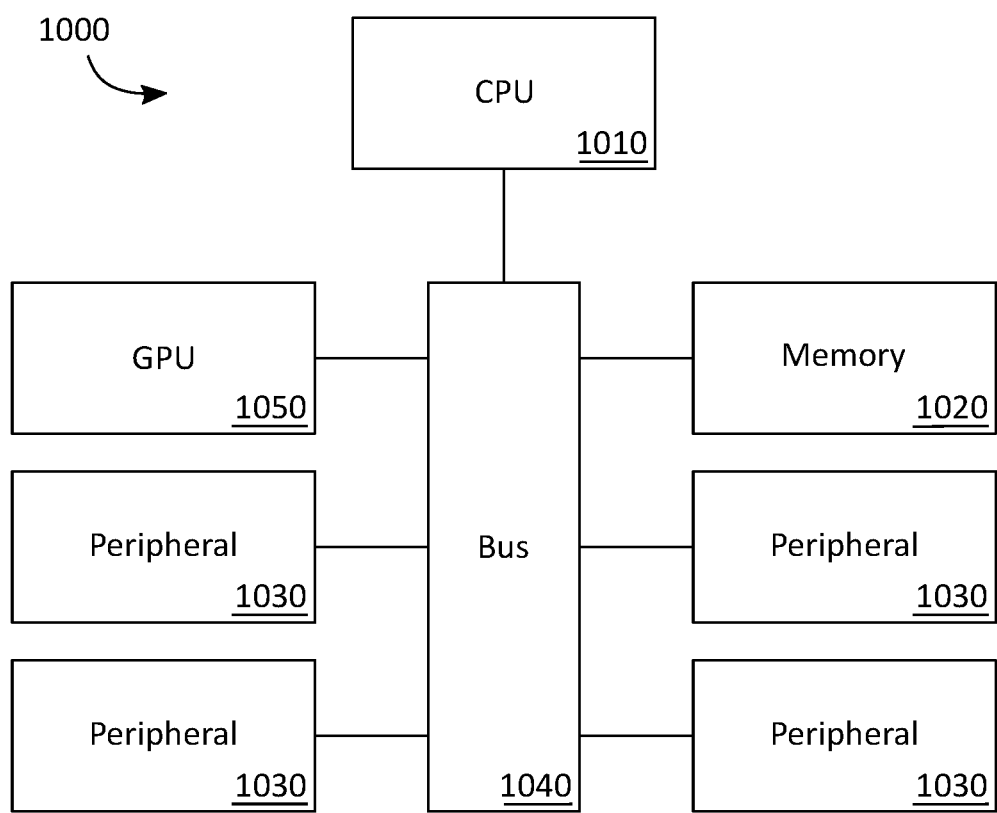
FIG. 6 shows an example computer system.

FIG. 6 shows a block diagram of an example computer system 1000, which may perform the function of the storage controller.

The system 1000 comprises a CPU (central processing unit) 1010, a main memory 1020, one or more peripherals 1030, and a GPU (graphics processing unit) 1050. The CPU 1010, main memory 1020, peripherals 1030, and GPU 1050 are connected by a bus 1040. In the case of a PCIe (PCI Express) topology, the bus 1040 includes a root complex, and each of the peripherals 1030 and the GPU 1050 are PCIe endpoints. The GPU 1050 can communicate with the peripherals 1030 directly via the bus 1040. In some cases, more than one CPU 1010 and/or more than one GPU 1050 is provided.

The peripherals 1030 may include the drives in the array, storage controllers (such as RAID controllers), network controllers (such as network interface cards), switches (such as PCIe switches configured to connect further peripherals), or any of a variety of devices.

The peripherals 1030 and the GPU 1050 may have access to the main memory 1020 via the bus 1040. Through DMA (direct memory access), this can allow the peripheral 1030 or the GPU 1050 to read data to and write data from the main memory. This may involve copying the data from main memory 1020 to a memory local to the peripheral 1030 or the GPU 1050.

In some cases, the memory space for the CPU 1010 and the GPU 1050 can be shared via unified virtual memory. This allows for a pointer to a single memory address to be passed between the CPU and the GPU without the need to copy data between a main memory 1020 and a local memory.

Computer system 500 may be used to implement the methods noted above. For example, CPU 1010 or GPU 1050 may run a program which operates as a driver to one or more of the storage device peripherals 1030.

The storage device peripherals 1030 (that is, the drives) may be of different types. A relatively fast storage device peripheral 1030 may be used to store metadata (such as a mapping between virtual and physical locations) and an array of relatively slow storage device peripherals 1030 may be used to store the underlying data. In some cases, some of the storage device peripherals 1030 used to store the underlying data can be of mixed types, including one or more hard disk drives, solid state drives, RAM devices, or non-volatile RAM devices.

Interpretation

A number of methods have been described above. Any of these methods may be embodied in a series of instructions, which may form a computer program. These instructions, or this computer program, may be stored on a computer readable medium, which may be non-transitory. When executed, these instructions or this program cause a processor to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The steps of the methods have been described in a particular order for ease of understanding. However, the steps can be performed in a different order from that specified, or with steps being performed in parallel. This is the case in all methods except where one step is dependent on another having been performed.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments, the invention is not restricted to these embodiments. It is possible to modify these embodiments without departing from the spirit or scope of the invention.

The invention claimed is:

1. A method comprising:
   receiving a request to read data stored in a stripe of an array of drives;
   determining, in response to receiving the request to read the data, that the data is stored on one or more degraded drives in the array;
   reconstructing the data from one or more drives in the array other than the degraded drives;
   storing the reconstructed data in a buffer;
   providing the reconstructed data from the buffer in response to the request; and
   after providing the reconstructed data, writing the reconstructed data to one or more drives in the array other than the degraded drives.

2. The method of claim 1, wherein the data stored in the array is erasure encoded.

3. The method of claim 1, wherein reconstructing the data from one or more drives in the array other than the degraded drives comprises:
   reconstructing the data from other data in the same stripe, the other data being stored on the one or more drives in the array other than the degraded drives.

4. The method of claim 1, wherein the reconstructed data comprises:
   the data corresponding to the request to read the data stored in the array of drives; and
   one or more additional pieces of data.

5. The method of claim 1, wherein writing the reconstructed data to one or more drives in the array other than the degraded drives comprises:
   identifying a plurality of blocks of reconstructed data; and
   writing the plurality of blocks of reconstructed data as a stripe in the array.

6. The method of claim 1, wherein writing the reconstructed data to one or more drives in the array other than the degraded drives comprises:
   using a garbage collection process to write the reconstructed data to one or more drives in the array other than the degraded drives.

7. The method of claim 1, wherein determining that the data is stored on one or more degraded drives in the array comprises:
   determining that attempts to obtain the data have failed after a threshold time.

8. The method of claim 1, wherein determining that the data is stored on one or more degraded drives in the array comprises:
   determining that the one or more degraded drives have failed.

9. A system comprising:
   one or more processors; and
   a memory storing instructions which, when executed by the one or more processors, cause the system to:
     receive a request to read data stored in a stripe of an array of drives;
     determine, in response to receiving the request to read the data, that the data is stored on one or more degraded drives in the array;
     reconstruct the data from one or more drives in the array other than the degraded drives;
     storing the reconstructed data in a buffer;
     provide the reconstructed data from the buffer in response to the request; and
     after providing the reconstructed data, write the reconstructed data to one or more drives in the array other than the degraded drives.

10. The system of claim 9, wherein the data stored in the array is erasure encoded.

11. The system of claim 9, wherein reconstructing the data from one or more drives in the array other than the degraded drives comprises:
    reconstructing the data from other data in the same stripe, the other data being stored on the one or more drives in the array other than the degraded drives.

12. The system of claim 9, wherein the reconstructed data comprises:
    the data corresponding to the request to read the data stored in the array of drives; and
    one or more additional pieces of data.

13. The system of claim 9, wherein writing the reconstructed data to one or more drives in the array other than the degraded drives comprises:
    identifying a plurality of blocks of reconstructed data; and
    writing the plurality of blocks of reconstructed data as a stripe in the array.

14. The system of claim 9, wherein writing the reconstructed data to one or more drives in the array other than the degraded drives comprises:
    using a garbage collection process to write the reconstructed data to one or more drives in the array other than the degraded drives.

15. The system of claim 9, wherein determining that the data is stored on one or more degraded drives in the array comprises:
    determining that attempts to obtain the data have failed after a threshold time, or
    determining that the one or more degraded drives have failed.

16. A non-transitory computer readable medium storing instructions which, when executed by one or more processors, cause the one or more processors to perform steps comprising:
    receiving a request to read data stored in a stripe of an array of drives;
    determining, in response to receiving the request to read the data, that the data is stored on one or more degraded drives in the array;
    reconstructing the data from one or more drives in the array other than the degraded drives;
    storing the reconstructed data in a buffer;
    providing the reconstructed data from the buffer in response to the request; and
    after providing the reconstructed data, writing the reconstructed data to one or more drives in the array other than the degraded drives.

17. The computer readable medium of claim 16,
    wherein the data stored in the array is erasure encoded,
    wherein determining that the data is stored on one or more degraded drives in the array comprises determining that attempts to obtain the data have failed after a threshold time,
    wherein reconstructing the data from one or more drives in the array other than the degraded drives comprises reconstructing the data from other data in the same stripe, the other data being stored on the one or more drives in the array other than the degraded drives, and
    wherein writing the reconstructed data to one or more drives in the array other than the degraded drives comprises:

identifying a plurality of blocks of reconstructed data; and writing the plurality of blocks of reconstructed data as a stripe in the array.

\* \* \* \* \*